(12) United States Patent
Bakre et al.

(10) Patent No.: US 10,812,313 B2
(45) Date of Patent: *Oct. 20, 2020

(54) FEDERATED NAMESPACE OF HETEROGENEOUS STORAGE SYSTEM NAMESPACES

(71) Applicant: NetApp, Inc., Sunnyvale, CA (US)

(72) Inventors: Ajay Bakre, Bangalore (IN); Dhruva Krishnamurthy, Cupertino, CA (US); Kartheek Muthyala, Hyderabad (IN); Chhavi Sharma, New Delhi (IN); Rukma Talwadker, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 14/318,460

(22) Filed: Jun. 27, 2014

(65) Prior Publication Data

US 2015/0242454 A1 Aug. 27, 2015

(51) Int. Cl.
*H04L 29/00* (2006.01)
*H04L 29/06* (2006.01)
(Continued)

(52) U.S. Cl.
CPC ........ *H04L 29/06068* (2013.01); *G06F 3/067* (2013.01); *G06F 3/0658* (2013.01);
(Continued)

(58) Field of Classification Search
CPC ......... G06F 17/30238; G06F 17/30342; G06F 17/30946; G06F 17/30949;
(Continued)

(56) References Cited

U.S. PATENT DOCUMENTS 7,725,601 B2 5/2010 Conzola et al.
8,892,677 B1 * 11/2014 Grove ................. H04L 67/1097
709/213

(Continued)

OTHER PUBLICATIONS

International Search Report and Written Opinion for Application No. PCT/US2015/017160 dated May 18, 2015, 7 pages.
(Continued)

*Primary Examiner* — Diedra McQuitery
(74) *Attorney, Agent, or Firm* — Haynes and Boone, LLP

(57) ABSTRACT

A system and computer-based method for performing a data transaction in a network storage system is provided. In an embodiment, the method includes receiving, from a client, a first data transaction request including a first data identifier associated with a first namespace protocol; determining a storage system associated with the first data identifier and associated with a second namespace protocol; determining a second data identifier associated with the first data identifier, wherein the second data identifier conforms to the second namespace protocol; and forwarding a second data transaction request including the second data identifier to the storage system based on determining an association between the second data identifier and the first data identifier, wherein the first namespace protocol and the second namespace protocol are different.

16 Claims, 9 Drawing Sheets

(51) Int. Cl.
*G06F 16/22* (2019.01)
*G06F 16/901* (2019.01)
*G06F 3/06* (2006.01)
*G06F 16/188* (2019.01)
*G06F 16/16* (2019.01)
*H04L 29/12* (2006.01)

(52) U.S. Cl.
CPC .......... *G06F 16/166* (2019.01); *G06F 16/196* (2019.01); *G06F 16/2291* (2019.01); *G06F 16/9017* (2019.01); *G06F 3/0644* (2013.01); *H04L 61/1576* (2013.01)

(58) Field of Classification Search
CPC ......... G06F 17/30952; G06F 17/30955; G06F 3/0644; G06F 9/466
USPC ....... 707/652, 694, 696, 703, 711, 715, 716, 707/741, 745, 747, 770, 821, 823, 825, 707/826, 827, 828, 830
See application file for complete search history.

(56) References Cited

U.S. PATENT DOCUMENTS

| | | | | |
|---|---|---|---|---|
| 2004/0133606 | A1* | 7/2004 | Miloushev | G06F 17/30091 |
| 2006/0074876 | A1* | 4/2006 | Kakivaya | G06F 17/30067 |
| 2006/0265508 | A1* | 11/2006 | Angel | H04L 29/12047 709/230 |
| 2007/0055703 | A1* | 3/2007 | Zimran | H04L 29/12594 |
| 2007/0088702 | A1* | 4/2007 | Fridella | G06F 17/30123 |
| 2008/0016107 | A1* | 1/2008 | Worrall | G06F 3/0611 |
| 2008/0126369 | A1* | 5/2008 | Ellard | G06F 16/10 |
| 2011/0137966 | A1* | 6/2011 | Srinivasan | H04L 67/1097 707/828 |
| 2012/0330894 | A1* | 12/2012 | Slik | G06F 16/1824 707/626 |
| 2013/0185258 | A1* | 7/2013 | Bestler | G06F 17/30197 707/638 |
| 2013/0268644 | A1* | 10/2013 | Hardin | H04L 67/1097 709/223 |
| 2013/0290648 | A1* | 10/2013 | Shao | G06F 12/04 711/154 |
| 2014/0366155 | A1* | 12/2014 | Chang | G06F 21/10 726/27 |

OTHER PUBLICATIONS

Extended European Search Report dated Sep. 27, 2017 for Application No. EP157516006 filed Sep. 1, 2016, 7 pages.

* cited by examiner

| Key:<br>Unified Namespace Data ID | Value:<br>(Storage System, Namespace, Local Namespace Data ID) |
|---|---|
| /project/alpha/usr/* | Storage System A, Namespace A, "v1/proj/alpha/usr/*" |
| /project/alpha/design_spec.txt | Storage System C, Namespace B, #09548a22 |
| /project/alpha/status.chk | Storage System E, Namespace A, "v5/proj/alpha/status.chk" |
| ... | ... |

Database Portion 202

| Key:<br>Unified Namespace Data ID | Value:<br>(Storage System, Namespace, Local Namespace Data ID) |
|---|---|
| /pub/* | Storage System B, Namespace B, #524a687d |
| /libs/A-B/* | Storage System B, Namespace B, #02586111 |
| /libs/C/* | Storage System A, Namespace A, "v1/libs/C/*" |
| ... | ... |

Database Portion 202

Figure 2A

| Key:<br>Unified Namespace Data ID | Value:<br>(Storage System, Namespace, Local Namespace Data ID) |
|---|---|
| #00000001 | Storage System A, Namespace A, #0f00a105 |
| #00000003 | Storage System C, Namespace B, #09548a22 |
| #00000004 | Storage System E, Namespace A, #0d3385a0 |
| ... | ... |
| #00000002 | Storage System B, Namespace B, #524a687d |
| #00000006 | Storage System B, Namespace B, #02586111 |
| #00000007 | Storage System A, Namespace A, #000045f6 |
| ... | ... |

250

Database Portion 202 (first group)

Database Portion 202 (second group)

Figure 2B

| UUID 302 | File/Object Name 304 | Prefix 306 | File Handle 308 | Parent File Handle 310 | Creation Time 312 | Access Time 314 | Size 316 | Type 318 | Location 320 |
|---|---|---|---|---|---|---|---|---|---|
| 12a3f49 | | / | 0 | -1 | 00:01 01/11/2013 | 00:01 10/11/2013 | 0 | NULL | NFS_Store1:/vol1 |
| 18C67u7 | Students | / | 1 | 0 | 01:01 02/11/2013 | 22:01 10/11/2013 | 0 | DIR | NFS_Store1:/vol1/stud |
| 9ui76j82 | John | /Students | 2 | 1 | 01:04 02/11/2013 | 12:01 09/11/2013 | 12 | FILE | NFS_Store1:/vol1/stud/john |
| 78ji193a | Smith | /Students | 4 | 1 | 05:15 07/11/2013 | 23:01 09/11/2013 | 100 | FILE | NFS_Store1:/vol1/stud/smith |
| 8ab5yia | Expense-report1 | / | 5 | 0 | 17:01 08/11/2013 | 17:01 08/11/2013 | 1023 | FILE | Obj_Store1:8ab5yia |
| U75bak9 | Students-report1 | /Students | 7 | 1 | 16:01 17/11/2013 | 16:01 17/11/2013 | 1198 | FILE | https://s3/account1234/studentrecords/students-rep-1 |

Figure 3

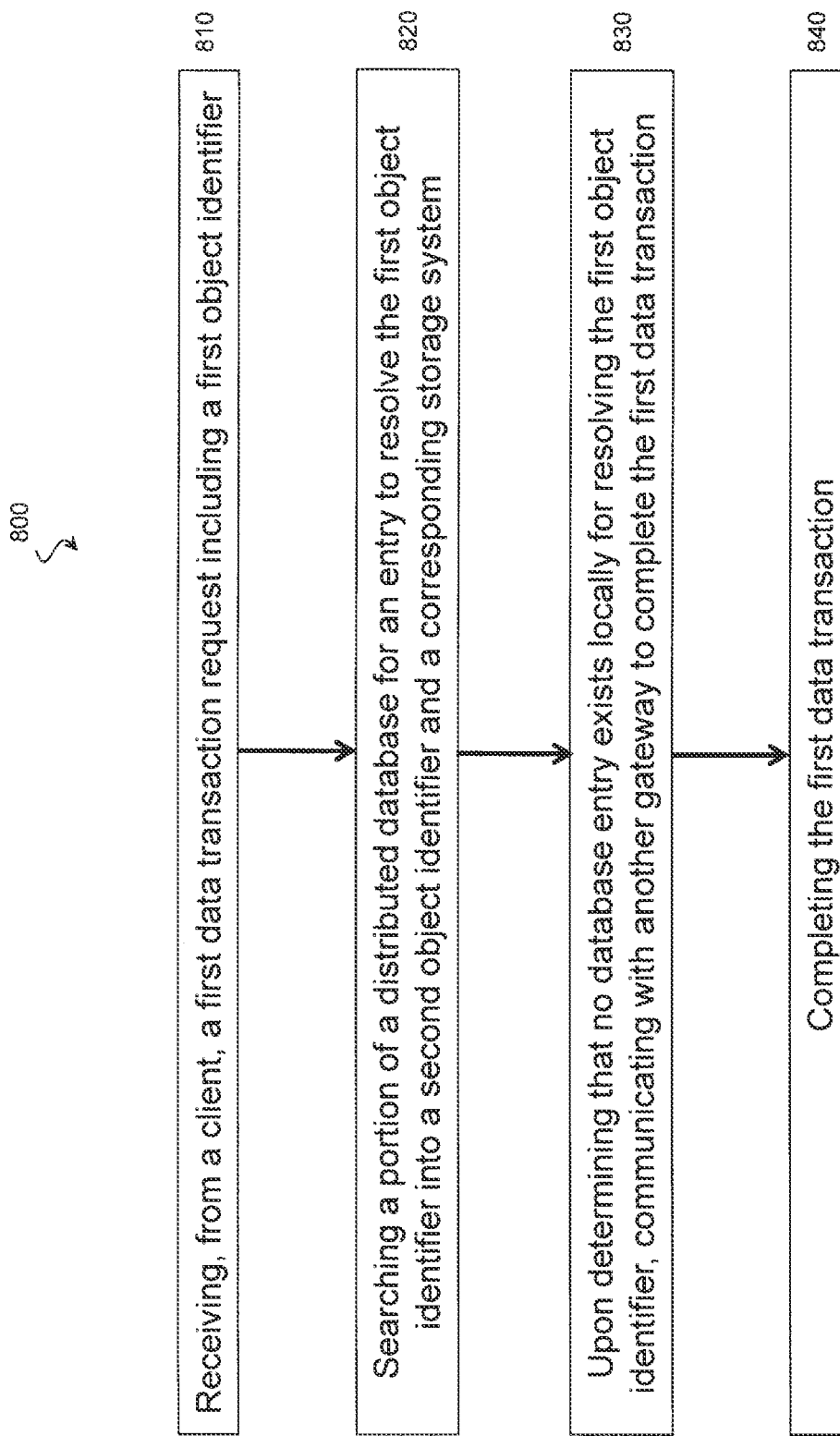

FEDERATED NAMESPACE OF HETEROGENEOUS STORAGE SYSTEM NAMESPACES

TECHNICAL FIELD

The present description relates generally to data storage and, more specifically, to providing a single unified namespace across multiple storage systems, each having its own independent namespace.

BACKGROUND

Network-based storage and cloud storage has become a common way for entities to save their data. However, as such storage options have become more common, they have also become more complex. In a simplified example, a single client accesses data from a single data store of a networked storage system by sending data transactions (e.g., read and/or write requests) to the storage system, which executes the requested transactions on a connected data store. The client refers to the desired data using a data identifier, which in various examples includes a file name, a path name, and/or a virtual memory address. The storage system, and typically a storage controller thereof, translates the data identifier into a unique location for the data within the data store. In this way, the storage system virtualizes the organization of data on the data store and hides the complexity of the underlying data storage techniques from the client. The identifier used by the client in the data transaction does not necessarily contain the location or address within the data store; rather, the storage system translates the identifier into a corresponding address. The storage controller then performs the requested operation on the data at the address in the data store and sends a response to the client.

The data identifier used by the client conforms to a first namespace, which in this example, includes a protocol for identifying data objects. Different storage systems may use different (heterogeneous) namespaces, and the addition of further storage systems to the example above introduces complexity to the system due to the additional namespace to data location transformations. In that regard, in some conventional systems, a client in communication with two or more storage systems may have to be cognizant of the heterogeneous namespaces and may have to conform its data transactions to the namespace associated with whichever storage system the transaction is sent to.

Furthermore, conventional namespace techniques encounter problems of scale when the number of storage systems and namespaces grows. For example, conventional file-based storage systems do not scale smoothly because each file path must resolve to a single storage system. In other words, each directory of files must reside on one and only one system.

In order to relieve the burden of managing multiple namespaces from the clients, it would be desirable to have a storage system in which a client can access multiple storage systems without being exposed to the complexity of multiple disparate namespaces. That is to say, creating a federation of heterogeneous namespaces would allow a client to use a single identifier format to specify data regardless of the actual namespace in which the data resides. It would be additionally beneficial if the techniques for providing translation of the identifiers scaled seamlessly as data set size grows.

BRIEF DESCRIPTION OF THE DRAWINGS

The present disclosure is best understood from the following detailed description when read with the accompanying figures.

FIGS. 2A and 2B are illustrations of exemplary Key-Value (KV) databases according to various embodiments.

FIG. 3 is an illustration of a further exemplary KV database according to one embodiment.

FIG. 8 is an illustration of an example process adapted according to one embodiment.

DETAILED DESCRIPTION

Figure 1:
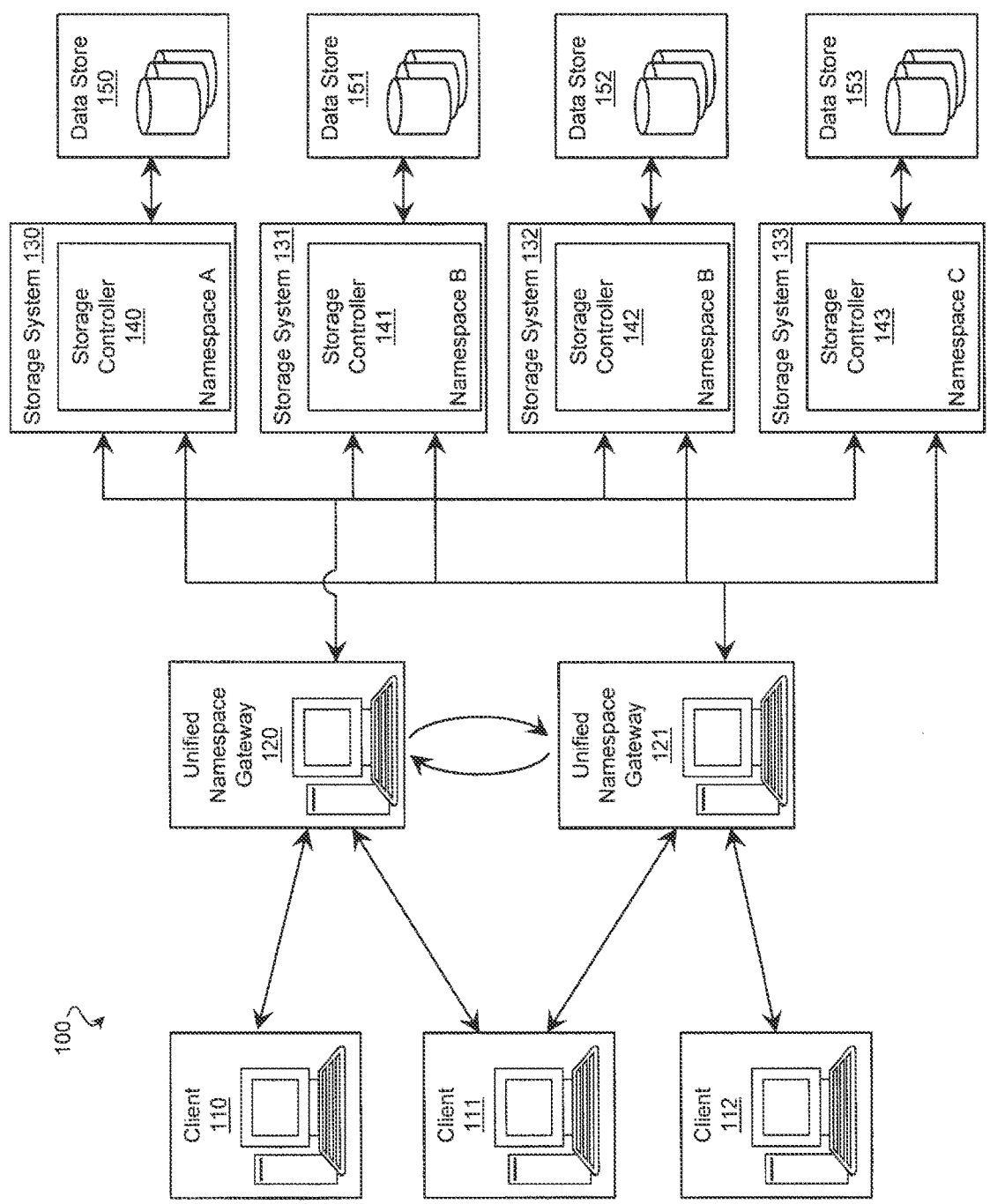
FIG. 1 is an illustration of an example storage architecture, adapted according to one embodiment.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer program products that join any number of storage systems including storage systems that have incompatible namespaces for specifying data. The embodiments provide a single unified namespace by which clients can refer to data located on different storage systems. Many embodiments include a gateway system that translates data transactions directed to the unified namespace into a protocol and namespace associated with a particular storage system and that forwards the translated transaction on to the respective system. In this way, the gateway system simplifies the task of specifying data located on a group of heterogeneous storage systems.

In an example, one or more clients are in communication with multiple, different storage systems, where some of the storage systems use different namespaces. Storage system refers generally to any suitable data storage system. In one example, a storage system includes a network storage system with multiple storage drives, one or more storage controllers, and a storage server that communicates with the storage controllers. Thus, the storage system can be a network storage system that, by itself, could provide storage to multiple clients. The clients communicate with the storage system by sending and receiving data transactions to the storage system and in particular, to the storage controller of the storage system. In order to reference a particular data object, a transaction include a data identifier that uniquely identifies a data Object and that conforms to a namespace of the storage system.

However, namespaces may differ between storage systems as noted above, and even where namespaces are the same, underlying storage systems may be incompatible due to complications such as incompatible software configurations or software release versions. Accordingly, in an example, a data storage environment including a number of storage systems further includes a gateway that is disposed communicatively between the client and the storage systems. In some embodiments, a gateway is a separate computing system distinct from the client and the storage systems. In some embodiments, a gateway is a module of a storage system. In yet further embodiments, the storage environment includes some storage systems that include gateway modules and some storage systems that interface with discrete gateway systems.

The gateway receives transactions that refer to data using a first namespace and translates the transaction to refer to data using a second namespace particular to the storage system. In this way, the gateway hides the underlying storage architecture from the client. Thus, in these examples, the client is unaware of the multitude of different storage systems. When the client sends a read or write request, the gateway translates the data identifier in the request to a namespace appropriate for whichever storage system will handle the request. For example, one storage system may use an NFS protocol, while a second uses an CIFS/SMB protocol and a third uses HTTP.

A particular technique for facilitating the namespace translation at the gateway includes the use of a database of Key-Value (KV) pairs. At its most basic, querying a database using a key returns a corresponding value. In an example of a database used for namespace translation (i.e., namespace resolution), the keys includes the data identifier used by the client in its request. The values associated with the keys each include an identification of the appropriate storage system (e.g., in the case of a read request, the storage system that stores the data), an identifier of the namespace of the storage system, and another data identifier that is understood by the storage system to refer to the data identified by the key. This tatter data identifier conforms to the namespace of the storage system. Thus, upon receipt of a data transaction from a client, the gateway uses the data identifier in the transaction to traverse the KV pairs, finding the corresponding key. The gateway accesses the data in the value to determine which storage system owns the data and what data identifier to use. The gateway then sends a modified transaction to the identified storage system using the translated data identifier from the value.

To provide multiple points of access, gateways may be clustered and a database of namespace translations may be distributed over the gateways with each gateway storing at least a portion of the database. The gateways may act as peers so that when any gateway receives a transaction, it is operable to query its peer nodes to determine an appropriate translation if the relevant portion of the database is not stored locally. In this way, the systems and methods of these embodiments can join heterogeneous pools of storage across networks and sites in a manner that is transparent to the client systems. Many embodiments also provide transparent redundancy. For example, transactions can be handled by other gateways in the cluster should a particular gateway fail, and redundant storage systems can be brought on line to replace a failing device without interruption.

FIG. 1 is an illustration of exemplary storage architecture 100, adapted according to one embodiment. The storage architecture 100 includes clients 110-112, gateways 120 and 121, and storage systems 130-133. Clients 110-112 in this example include clients that use the storage systems 130-133 for storage. For instance, each of clients 110-112 may run one or more applications (e.g., word processing or database programs) that utilize the storage architecture. Each client 110-112 includes a computer system that interacts with gateways 120 and 121 for submitting read/write access requests and for receiving or transmitting data from storage systems 130-133 via gateways 120 and 121.

Gateways 120 and 121 each include a computer system that executes applications and interacts with the clients 110-112 for receiving read/write access requests and receiving or transmitting data from or to the clients 110-112. Gateways 120 and 121 in this example may be connected to the clients 110-112 over a network such as a local area network (LAN), an Ethernet subnet, a PCI or PCIe subnet, a switched PCIe subnet, a wide area network (WAN), metropolitan area network (MAN), the Internet, or the like. The gateway functionality described herein may be included in applications that are run on the computer systems that constitute gateways 120 and 121. Each gateway 120 and 121 may include any appropriate computer hardware and software, such as, e.g., a general-purpose computer configured to execute any of a variety of operating systems, including the Unix™, Linux™, and Microsoft Windows™ operating systems.

The storage systems 130-133 in this example each include a storage controller (e.g., storage controllers 140-142) that exercises low-level control over a set of networked storage devices referred to collectively as a data store (e.g., data stores 150-153) in order to read and write data to the storage devices of the data store. Examples of storage hardware that can be used in each data store 150-153 include hard disk drives (HDDs), solid state drives (SSDs), optical drives, and/or any other suitable volatile or non-volatile data storage medium, though the scope of embodiments is not limited to any particular storage hardware. The storage controllers 140-142 each have an associated namespace and process transactions identifying data in a respective namespace protocol. To do so, the storage controllers 140-143 may translate addresses within the associated namespace to a data location on a storage device of a data store.

As shown in FIG. 1, each of the clients 110-112 is in communication with at least one of the gateways 120 and 121. For instance, client 110 is in communication with gateway 120; client 111 is in communication with gateways 120 and 121; and client 112 is in communication with gateway 121. In turn, each of the gateways 120-121 is in communication with each of the storage systems 130-133. Thus, gateway 120 is in communication with all of storage systems 130-133, as is gateway 121, and each of the clients 110-112 can reach any of the storage systems 130-133 via one of the gateways 120 or 121. Gateways 120 and 121 may also be in communication with each other, e.g., over a LAN or other type of network.

Each of the clients 110-112 can send a request to create a file, read a file, write a file, change a directory, look up a file, or any other suitable data transaction to a gateway with which it is in communication. The gateways 120 and 121 translates an identifier of the file or directory into a namespace of an underlying storage device and thereby provides a unified namespace technique so that complexity of the storage architecture is hidden from clients 110-112, as described in detail below. The following example use case illustrates a read request from client 111 to gateway 120, and it is understood that similar action may be performed by any of the clients 110-112 with any of the gateways 120 and 121, assuming a network connection therebetween.

Continuing with the example, client 111 issues a read request to gateway 120. Client 111 is in communication with both of gateways 120 and 121 and may issue the read request to gateway 121 rather than to gateway 120 for any appropriate reason, e.g., load balancing.

The read request from client 111 includes a first data identifier in the unified namespace. The first data identifier in this example uniquely identifies the object (e.g., an object, file, or block), although it does not comply with a namespace used by any of the storage systems 130-133 and would not properly identify data if sent directly to any of the storage systems 130-133.

Gateway 120 receives the read request and determines a particular storage system 130-133 to which to send the read request. Gateway 120 also determines a second data identifier to use when sending the read request to the particular storage system. Various embodiments may use any appropriate technique to resolve a particular storage system or data identifier upon receipt of a request from a client. In the present example, gateways 120 and 121 use a database of KV pairs to resolve storage systems and data identifiers. The gateway 120 creates a second read request that references data using the second data identifier and forwards the second request to the identified storage system of systems 130-133.

Moving to FIG. 2A, an illustration of an exemplary KV database 200 according to one embodiment is provided. On the left side, the keys include the unified namespace identifiers that are provided from and to clients 110-112. In various embodiments, the unified namespace identifiers include block-level identifiers, file-level identifiers, and/or object identifiers. Block-level data identifiers refer to data using an address that corresponds to a sector of a storage device and may include a physical address (i.e., an address that directly map to a storage device) and/or a logical address (i.e., an address that is translated into a physical address of a storage device). Exemplary block-level protocols include iSCSI, Fibre Channel, and Fibre Channel over Ethernet (FCoE). In contrast, file-level protocols specify data locations by a file name. A file name is an identifier within a file system that can be used to uniquely identify corresponding memory addresses. File-level protocols rely on a system such as one of the unified namespace gateways 120 and 121 and/or a storage system to translate the file name into respective storage device addresses. Exemplary file-level protocols include CIFS/SMB, SAMBA, and NFS. Object-level protocols are similar to file-level protocols in that data is specified via an object identifier that is eventually translated by another system into a storage device address. However, objects are more flexible groupings of data and may specify a cluster of data within a file or spread across multiple files. Object-level protocols include CDMI, HTTP, and S3.

In the embodiments of FIG. 2A, the unified namespace identifiers are file-level identifiers. Commonly, a file-level namespace identifier includes a filename suffix and a path prefix that indicates a directory structure in which the data corresponding to the filename is said to reside. In a conventional system, the path determines the storage system on which the data resides, with each directory being assigned to a particular system. This does not allow data residing within a given directory to be split across more than one storage system. However, by using the KV database 200 discussed below, many embodiments of the present disclosure allow each individual file to reside on any storage system (e.g., systems 130-133) regardless of the path prefix.

Upon receiving a unified namespace identifier, a computing system such as one of gateways 120 and 121 can query the KV database 200 using the identifier. On the right side of the illustrated KV database 200, the associated values include an identifier of a storage system, an identifier of a namespace, and an identifier corresponding to the object in the namespace of the particular storage system. In this way, a query using the unified namespace identifier will return a value that specifies which storage system the data resides on, a namespace used by the storage system, and/or an identifier specifying the data at the storage system. As can be seen, the database 200 may be divided into database portions 202, which in some embodiments are distributed among multiple computing systems such as gateways 120 and 121. As discussed in further detail below, a distributed database 200 has many advantages such as redundancy and load balancing that become particularly important as database size increases.

Continuing with the example in which the client 111 sends a read request to gateway 120, the exemplary read request issued from client 111 includes the data identifier "/project/alpha/design_spec.txt" which is a file-level unified namespace data identifier. The gateway 120 traverses the KV database to find a corresponding identifier particular to a storage system and within the namespace of the storage system. In this example, the gateway 120 traverses the KY database using a key that includes the data identifier ("/project/alpha/design_spec.txt"), although in other examples, the data value may be tokenized such that the key corresponds to the data identifier without necessarily including the data identifier. Returning to this example, the gateway 120 reads the value corresponding to the key, which in this example includes "Storage System C, Namespace B, #09548a22". Therefore, gateway 120 has information indicating that the read request should be sent to Storage System C using Namespace B and data should be identified to Storage System C using the block-level identifier #09548a22. It is noted that the identifier used by the storage system need not be the same or even the same type (e.g., file-level/block-level) as the unified namespace data identifier.

Assuming in this example that "Storage System C" corresponds to storage system 132 of FIG. 1, gateway 120 then forwards the read request to storage system 132 indicating that the read request is for object #09548a22. Storage controller 142 of storage system 132 then maps the data identifier #09548a22 to one or more storage locations within its physical stores drives (using its own internal mapping tables), reads the corresponding data, and returns the results to gateway 120. Gateway 120 forwards the results on to requesting client 111 using the unified namespace protocol.

Referring now to FIG. 2B, an illustration of a further exemplary KV database 250 according to one embodiment is provided. On the left side, the keys include the unified namespace identifiers that are provided from and to clients 110-112. In contrast to the embodiments of FIG. 2A, the unified namespace identifiers include block-type data identifiers that correspond to addresses where the data is stored. On the right side, the associated values include an identifier of a storage system, an identifier of a namespace, and an identifier corresponding to the object in the namespace of the particular storage system. In this way, a query using the block-level unified namespace identifier will return a value that specifies which storage system the data resides on, what namespace is used by the storage system, and what identifier specifies the data at the storage system. Similar to the examples of FIG. 2A, the database 250 may be divided into database portions 202, which in some embodiments are distributed among multiple computing systems such as gateways 120 and 121.

While the exemplary databases of FIGS. 2A and 2B contain keys of a single identifier type (file-level and block-level, respectively), further exemplary databases include keys of any number of identifier types. Thus, the unified namespace may support block-level identifiers, file-level identifiers, and/or object identifiers, concurrently. This provides "file object duality", whereby different clients can access the same element of data using different protocols.

FIG. 3 is an illustration of one such database 300 according to various embodiments. The database 300 includes records comprising various fields. The illustrated examples include a UUID 302 (a randomly generated unique value assigned to the record), a name 304 particular to the object or file, a prefix 306 corresponding to a path of a file or a prefix of an object, a file handle 308 uniquely identifying the file for NFS compatibility, a file handle 310 uniquely identifying a parent of the file for NES compatibility, a creation time 312, an access time 314, a size 316, a type 318 such as file or directory, and a location 320. Similar to the values of databases 200 and 250, the location 320 may specify a storage system the data resides on, a namespace used by the storage system, and/or an identifier specifying the data at the storage system.

Expanding on the KV concept, multiple fields of the database 300 may correspond to searchable keys. For example, to facilitate searches, the database 300 may be queried using the name field 304. To facilitate directory listings, the database 300 may also be queried using the prefix field 306. To facilitate NFS file handling, the database 300 may also be queried using the file handle 308 and/or parent file handle 310 fields. The available fields and the fields indexed for querying have an impact on the database performance, and, in many embodiments, the database 300 is configured to optimize those transactions expected to be most common. For example, in the illustrated database 300, moving and renaming a file is performed by updating the file name 304 field of a single record. However, moving or renaming a directory is performed by updating at least the prefix 306 field of all contained files and subdirectories. If this proves unduly burdensome, the prefix 306 field may be omitted in favor of the parent file handle 310. This may optimize directory moves and renaming, but possibly at the expense of other transactions such as a directory listing transaction. Accordingly, it can be seen that the database 300 provides sufficient flexibility to optimize gateway performance for nearly any given environment.

The examples above refer to a read request, although the scope of embodiments includes other data transactions, such as write requests, as well. In one example, the gateway 120, upon receiving a write request creates a new KV pair in its database to indicate the unified namespace identifier, storage system identifier, namespace identifier, and data identifier for use with the storage system. The gateways 120 and 121 may keep their KV tables up to date by modifying them in response to newly-written data and modified data, thereby ensuring that subsequent data transactions access the correct data.

Figure 4:
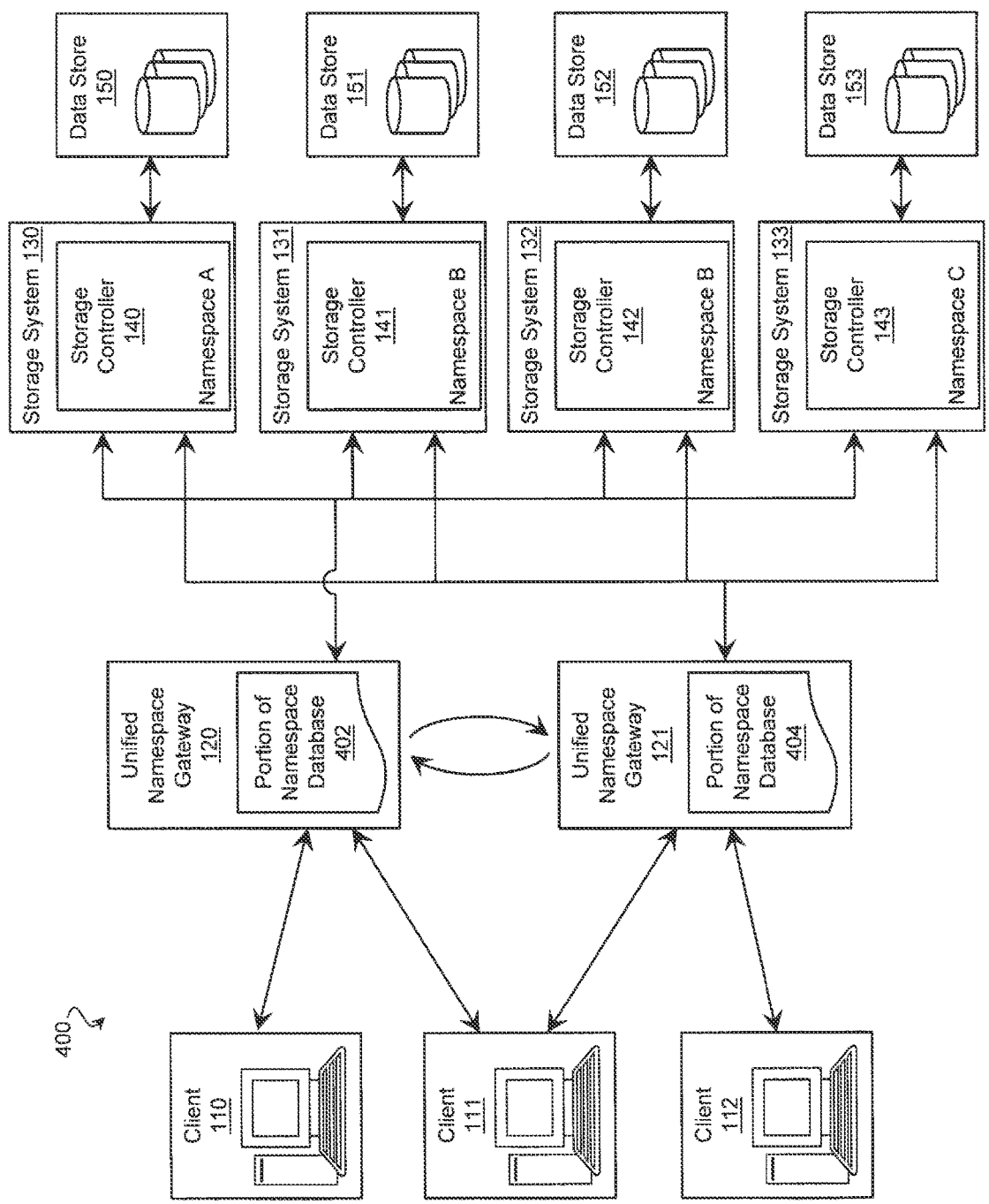
FIG. 4 is an illustration of an example storage architecture, adapted according to one embodiment, and using a distributed database for KV pairs.

Furthermore, the examples above illustrate a case in which gateway 120 includes a comprehensive database to map the KV pairs. Other embodiments use a distributed database to store the KV pairs, and in such embodiments, a given gateway may not have direct, local access to a requested data identifier. FIG. 4 is an illustration of a storage architecture 400, adapted according to one embodiment and using a distributed database for KV pairs.

In FIG. 4, gateway 120 includes namespace database portion 402, and gateway 121 includes namespace database portion 404. Therefore, in a scenario in which a client sends a read request to gateway 120 for a particular object, gateway 120 may or may not have local access to the part of the namespace database including that object's identifiers. The same is true for gateway 121. The storage architecture 400 may provide one or more techniques to provide comprehensive access to the clients 110-112 so that each client can access any storage system from any gateway, despite individual gateway 120 and 121 having less than a full database stored locally.

Gateways 120 and 121 may use any appropriate distributed database technology in the example of FIG. 4. One example database technology includes the open source NoSQL distributed database under the name CASSANDRA, available from Apache Software Foundation. Another example database technology includes the open source NoSQL distributed database under the name RIAK, available from Basho Technologies. Of course, the scope of embodiments may include any appropriate distributed database technology, whether open source or otherwise.

Gateways 120 and 121 are in communication with each other via a network, such as a LAN or other suitable connection. In fact, gateways 120 and 121 may be in the same facility or geographic area or may be in different facilities or different geographic areas. For geographically-distributed systems, gateways 120 and 121 may communicate with each other via the Internet. As discussed further below, gateways 120 and 121 communicate with each other to provide access from any client 110-112 to any storage system 130-133.

In one example, client 111 sends a read request to gateway 120 using the unified namespace data identifier "/project/alpha/design_spec.txt" from the previous example. Gateway 120 queries its database portion 402 using the key corresponding to the identifier. In a scenario in which the gateway 120 finds the data identifier "/project/alpha/design_spec.txt" within database portion 402, gateway 120 forwards the read request to Storage System C (storage system 132 in the previous example) using data identifier #09548a22. This is consistent with example database 200 of FIG. 2.

In a scenario in which gateway 120 does not find data identifier "/project/alpha/design_spec.txt", it sends a message to other gateways to inquire whether those other gateways can resolve the unified namespace data identifier. In the present example, the other gateway is gateway 121, and gateway 120 sends a message to gateway 121 requesting that the unified namespace identifier "/project/alpha/design_spec.txt" be resolved. In sonic examples, the key or a hash thereof uniquely identifies those gateways storing the database portion containing the key. In these examples, knowing that gateway 121 can resolve the identifier, gateway 120 only inquires of gateway 121.

Storage architecture 400 may resolve the data identifier and handle the read request in any appropriate manner. According to one example, gateway 121 takes over responsibility for the read request if it is determined that namespace database portion stored on gateway 121 (i.e., database portion 404) includes an entry for identifier "/project/alpha/design_spec.txt". Taking over a data transaction may include one or more of: performing the translation of the data transaction from the unified namespace to a namespace associated with a storage system, providing the translated data transaction to the storage system, forwarding a response from the storage system to the requesting client, and/or translating the response from the namespace associated with the storage system to the unified namespace prior to forwarding it.

In such a scenario, gateway 121 reads the value associated with the key and determines that the corresponding value includes "Storage System C, Namespace B, #09548a22". Assuming that Storage System C corresponds to storage system 132, gateway 121 forwards the read request to storage system 132 with the data identifier #09548a22. Storage system 132 receives the read request, resolves data identifier #09548a22 using its own internal mapping to find one or more locations within its physical storage drives, reads the data from the location(s), and returns the data to gateway 121. Gateway 121 then either returns the requested data directly to requesting client 111 or sends the requested data to gateway 120 to forward to client 111.

In another example, gateway 120 searches its namespace database portion 302 using data identifier "project/alpha/design_spec.txt" and, not finding a match, sends a message to gateway 121 with the data identifier. However, in this example, gateway 121 does not take over responsibility for the read request. Instead, gateway 121 sends the value of the KV pair "Storage System C, Namespace B, #09548a22" to gateway 120. Gateway 120 then forwards the read request to storage system 132 with the data identifier #09548a22. Storage system 132 receives the read request, resolves data identifier #09548a22 using its own internal mapping to find one or more locations within its physical storage drives, reads the data from the location(s), and returns the data to gateway 120. Gateway 120 then returns the requested data to requesting client 111 using the unified namespace protocol.

Figure 5:
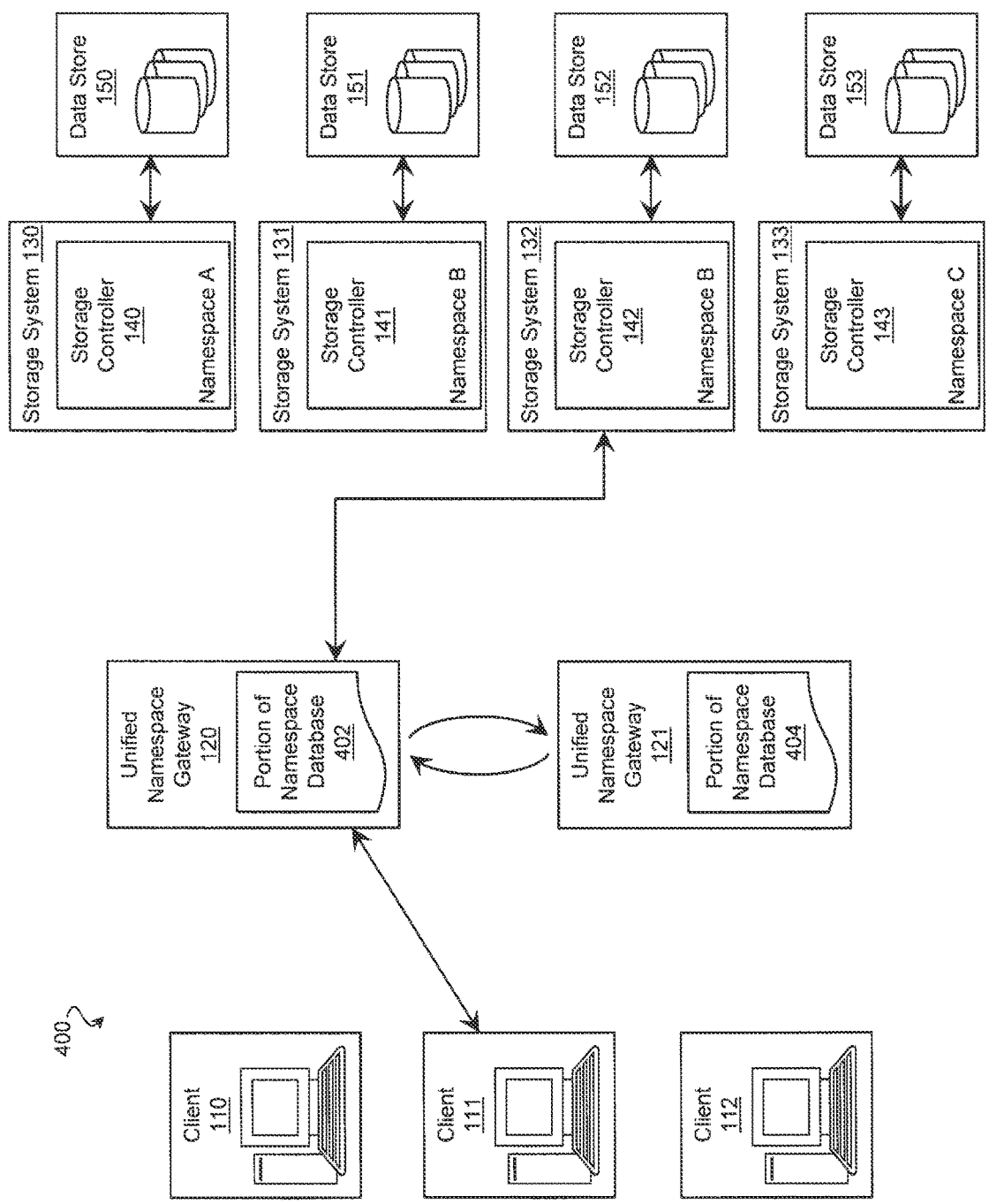
FIG. 5 is an illustration of an example storage architecture according to one embodiment.

Such a scenario is shown in FIG. 5, which is an illustration of storage architecture 400 according to one embodiment. The arrow between client 111 and gateway 120 indicates the client 111 issuing the request to gateway 120 and the gateway 120 returning the requested data to client 111. The arrow between gateway 120 and storage system 132 indicates sending the request from gateway 120 to storage system 132 with the resolved identifier and receiving the requested data from storage system 132. Arrows between gateways 120 and 121 indicate that gateways 120 and 121 communicate with each other to resolve a unified namespace data identifier wherever the KY pair may be stored.

The example in which the originating gateway follows through in completing the data transaction, despite not having resolving information stored locally for the data transaction, may be especially applicable to architectures in which some clients lack communication with some gateways. In those scenarios, the requested data is returned by the same gateway that received the request, thereby ensuring that a communication connection exists between the client and the gateway. Other examples in which another gateway takes over from the first gateway when the first gateway does not resolve the data identifier may be especially applicable to architectures in which clients are connected to multiple gateways. In many architectures, clients will be in communication with multiple gateways to provide fault tolerance.

Figure 6:
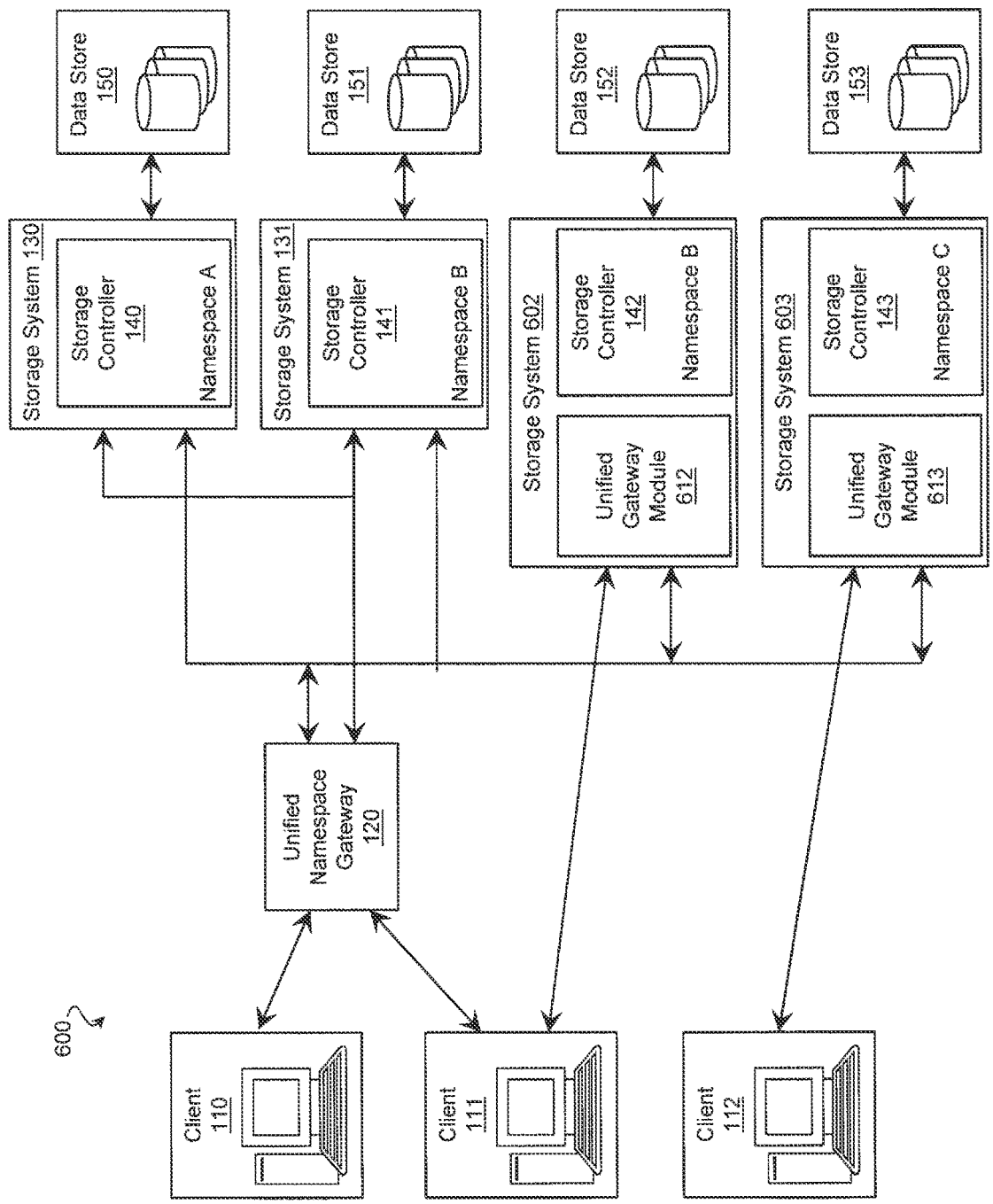
FIG. 6 is an illustration of an example storage architecture integrating a unified namespace gateway module into a storage system according to one embodiment.

In some embodiments, a unified namespace gateway is integrated into a storage system. FIG. 6 illustrates a storage architecture 600 according to one embodiment. In many respects, the unified gateway modules 612 and 613 operate substantially similar to unified namespace gateways such as gateways 120 and 121, and the storage systems 602 and 603 operate substantially similar to storage systems such as storage systems 130-133. In such embodiments, the storage systems 602 and 603, and in particular the gateway modules 612 and 613 of the storage systems, perform translation of a unified namespace identifier to an identifier within the namespace of a storage system. In this way, the gateway modules 612 and 613 provide frontends that allow respective storage systems 602 and 603 to service data access requests from a client even if the data does not reside on the storage system.

To perform the translation, the gateway module 602 may contain some or all of a namespace database. In some embodiments, if a unified namespace identifier is not contained within the portion of the namespace database stored by the gateway module 602, the gateway module 602 provides the unified namespace identifier to another gateway module or to a unified namespace gateway to translate. Once the unified namespace identifier is translated, the gateway module 602 may provide the request with the translated identifier to the corresponding storage system. Additionally, or in the alternative, the gateway module 602 may respond to the client, thereby causing the client to redirect the request to the corresponding storage system. The response from the gateway module to the client may include the translated identifier, an identifier of the corresponding storage system, an identifier of the associated namespace, and/or any other suitable information.

Figure 7:
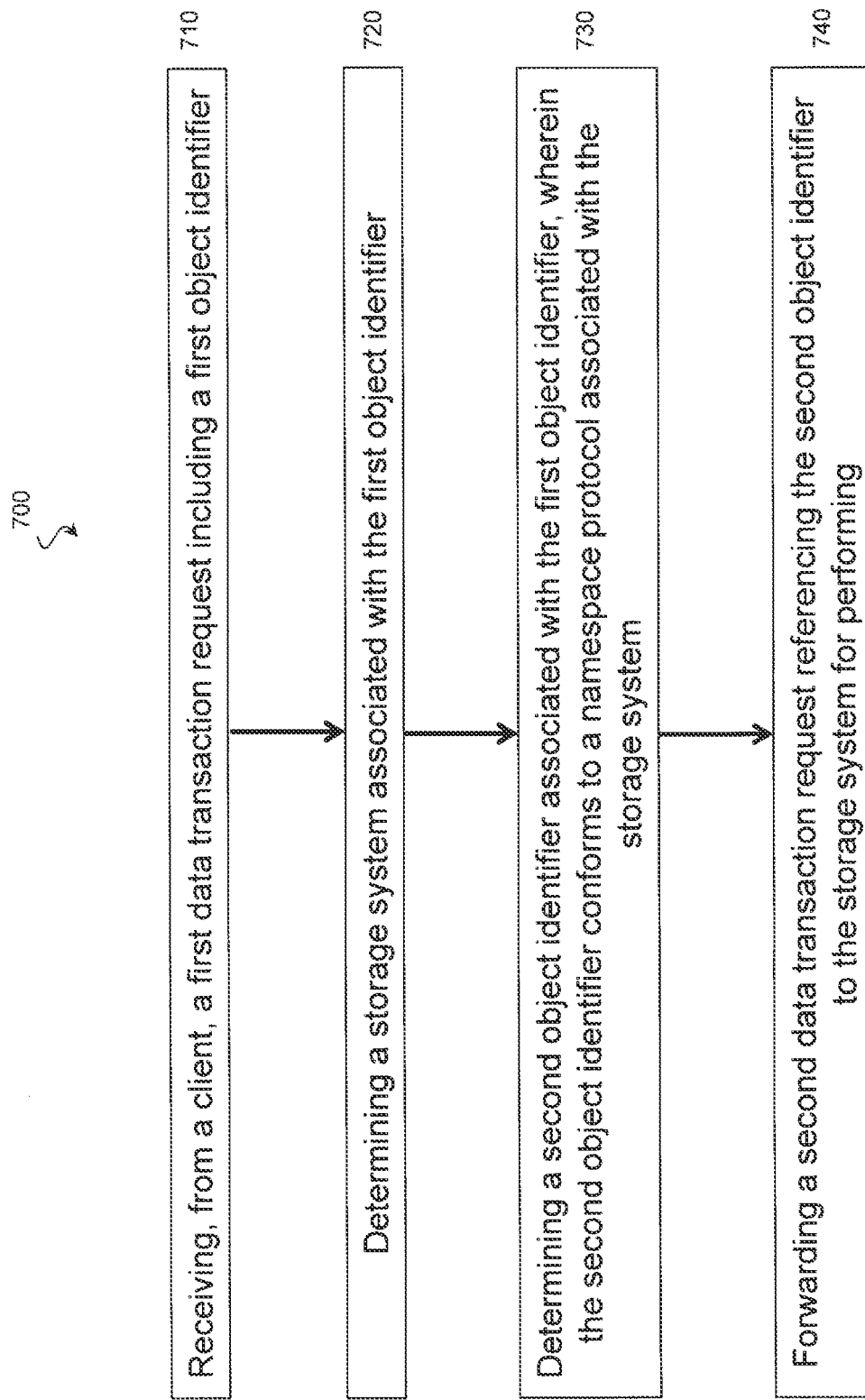
FIG. 7 is an illustration of an example process adapted according to one embodiment.

FIG. 7 is an illustration of example process 700 adapted according to one embodiment. Process 700 may be performed by one or more computer processors executing code to provide the functionality described above with respect to gateways 120 and 121 and gateway module 602.

At action 710, the gateway receives from a client a first data transaction request including a first data identifier. The data transaction request may include, for example, a read request or a write request. Furthermore, in this example, the first data identifier conforms to a first namespace protocol (e.g., a universal namespace protocol) that is not directly actionable by various underlying storage systems. This is due in part to the storage systems using one or more namespace protocols that are different from the first namespace protocol.

At action 720, the gateway determines a storage system associated with the first identifier. In one example, the gateway traverses a database of KV pairs to find an entry that corresponds to the first identifier. The value associated with the first identifier provides an indication of the storage system that should receive the data transaction request.

At action 730, the gateway determines a second data identifier associated with the first data identifier, wherein the second data identifier conforms to a namespace protocol associated with the storage system. In one example, the gateway determines the second data identifier by examining the same KV database entry that indicates the storage system in action 720.

Whereas the first data identifier conforms to the first namespace protocol, the second data identifier conforms to a namespace protocol of the storage system. For instance, the storage system uses a different namespace protocol than does the client, and the storage system's namespace protocol may also be different from namespaces used by other storage systems in the architecture. It is not necessary that any of the namespace protocols be compatible. In other words, the first data identifier conforms to a protocol that is not compatible with that of the storage system; similarly, the second data identifier conforms to a protocol that is not compatible with that of the client. Instead, the gateway translates between the namespace protocols to allow the client to perform data transactions on any storage system in the architecture while at the same time hiding the underlying storage architecture complexity from the clients. Thus, in some embodiments, the clients may only know and use the unified namespace protocol (of the first data identifier) and be unaware of the namespace protocols used by the storage systems.

At action 740, the gateway forwards a second data transaction request referencing the second data identifier to the storage system. A storage controller of the storage system maps the second data identifier to one or more physical storage addresses in its own data store and returns results to the gateway.

The scope of embodiments is not limited to the actions shown in FIG. 7, as other embodiments may add, omit, rearrange, or modify one or more actions. For instance, some processes may include repeating actions 710-740 for each transaction request received. Moreover, in examples in which the requested data transaction includes a write request, process 700 may also include updating a database of data identifiers to create or modify a record consistent with the written data. If the database is distributed among a multitude of gateways, updating the database may include identifying at least one gateway device to store the entry of the distributed database by, e.g., considering load balancing among the gateways. In a scenario in which the requested data transaction is a read request, process 700 may also include forwarding the read results to the client from the gateway.

FIG. 8 is an illustration of example process 800 adapted according to one embodiment. Process 800 may be performed by one or more computer processors executing code to provide the functionality described above with respect to gateways 120 and 121 and gateway module 602. In the process 800, a first gateway, having received a first data transaction request, finds that it does not have local access to a distributed database entry corresponding to requested data. The actions of FIG. 8 are discussed above with respect to FIGS. 4 and 5 as well.

At action 810, the gateway receives from a client a first data transaction request including a first data identifier. Action 810 is substantially similar to action 710 (FIG. 7), discussed above.

At action 820, the gateway searches a portion of a distributed database for an entry to resolve the first data identifier into a second data identifier and a corresponding storage system. An example of action 820 is given above, wherein the gateway traverses a database of KV pairs, where the keys in the KV pairs correspond to first data identifiers. Further, in action 820, the gateway has local access to a portion of a distributed database, where the portion is less than the full database and does not, by itself, provide comprehensive resolution of first data identifiers because some first data identifiers may be missing from the portion.

At action 830, upon determining that no database entry exists locally for resolving the first data identifier, the gateway communicates with another gateway to complete the first data transaction. For example, the gateway may forward the first data transaction request to the other gateway or may merely pass an inquiry to the other gateway, where the inquiry references the first data identifier. Any appropriate communication between gateways can be used by various embodiments to facilitate completion of the first data transaction.

At action 840, the first data transaction is completed, as facilitated by action 630. In some embodiments, the first gateway passes the first data transaction request to the second gateway, and the second gateway takes over responsibility for the first data transaction. The second gateway resolves the first data identifier into a corresponding storage system and second data identifier and requests the transaction from the storage system using the second data identifier (using, e.g., actions 720-740 of FIG. 7). The second gateway can communicate results of the data transaction to the requesting client itself or can forward the results to the first gateway, thereby allowing the first gateway to pass the results to the requesting client.

In another embodiment, the first gateway requests that the second gateway resolve the first data identifier and return the second data identifier and storage system identifier to the first gateway. Upon receipt of the second data identifier and storage system identifier, the first gateway then completes the transaction according to action 740 of FIG. 7.

Various embodiments may include one or more advantages over conventional systems. For instance, various embodiments provide a unified namespace that hides the complexity of the underlying data storage architecture from the clients. Such action allows the clients to use a single namespace and pass the burden of keeping track of namespaces to the gateways.

Furthermore, various embodiments use a distributed database of KY pairs to facilitate resolving data identifiers of the unified namespace. The distributed database may provide scalability because it can be used for a large volume of entries and can be split among a multitude of gateways. In other words, storage systems and gateways can be added to the storage architecture by updating the database and providing at least a portion of the database to added gateways.

When implemented via computer-executable instructions, various elements of embodiments of the present disclosure are in essence the software code defining the operations of such various elements. The executable instructions or software code may be Obtained from a non-transitory, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients, gateways, and storage systems include processor-based devices and may include general-purpose processors or specially adapted processors (e.g., an Application Specific Integrated Circuit). Such processor-based devices may include or otherwise access the non-transitory, tangible, machine readable media to read and execute the code. By executing the code, the one or more processors perform the actions of processes 700 and/or 800 as described above.

Thus, the systems and methods of the present disclosure provide a unified or federated namespace capable of identifying data across heterogeneous storage systems using a single universal identifier. In many embodiments a database used in translating data identifiers to and from the unified namespace is distributed across multiple gateway systems. This distributes the translational burden across the gateways and reduces system bottlenecks particularly as the size of the unified namespace grows.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   translating a first data transaction request including a first file-level identifier in a first namespace that conforms to a file-level protocol to a second data transaction request that conforms to an object level protocol, wherein the translating includes:
   accessing a distributed database of key-value pairs, the keys including a plurality of file-level identifiers and the values including a plurality of object identifiers conforming to the object level protocol, and wherein the distributed database includes the first file-level identifier as a first key among the key-value pairs;
   reading a first value paired with the first key, wherein the first value comprises,
      a first storage system identifier;
      an identifier of a second namespace, wherein the second namespace conforms to the object-level protocol; and
      a first object identifier in the second namespace;
   resolving the first object identifier from reading the first value; and
   forwarding to a first storage system identified by the first storage system identifier the second data transaction request including the first object identifier.

2. The method of claim 1, further comprising:
   sending a communication from a first gateway device storing the distributed database to a second gateway device for the second gateway device to determine whether a second database on the second gateway device includes the file-level identifier as a key.

3. The method of claim 1 further comprising:
   based on receipt of a third data transaction request that includes a second file-level identifier in the first namespace that conforms to the file-level protocol, accessing the distributed database to determine whether the distributed database includes the second file-level identifier as a key.

4. The method of claim 1, wherein the object-level protocol is S3 protocol or Cloud Data Management Interface protocol and the file-level protocol is Network File System protocol or Common Internet File System protocol.

5. The method of claim 1, wherein the first file-level identifier comprises a pathname and the first object-level identifier does not comprise a pathname.

6. A non-transitory machine readable medium having stored thereon instructions for performing a method comprising machine executable code which when executed by at least one machine, causes the machine to:
   translate a first data transaction request that includes a first file-level identifier in a first namespace that conforms to a file-level protocol to a second data transaction request that conforms to an object level protocol, wherein translating includes querying a first database of key-value pairs with the first file-level identifier, the keys including a plurality of file-level identifiers and the values including a plurality of object identifiers conforming to the object level protocol, wherein the first database is part of a distributed database;
   based on return of a first key-value pair that includes the first file-level identifier as the key, determine from the value of the first key-value pair a first storage system identifier, an identifier of a second namespace that conforms to the object-level protocol, and a first object-level identifier, thereby resolving the first object-level identifier using the first database;
   create the second data transaction request corresponding to the first data transaction request, wherein the second data transaction request is created with the first storage system identifier and the first object-level identifier instead of the first file-level identifier; and
   forward to a first storage system identified by the first storage system identifier the second data transaction request.

7. The non-transitory machine-readable medium of claim 6, wherein the code further comprises instructions to:
   based on receipt of a third data transaction request that includes a second file-level identifier in the first namespace that conforms to the file-level protocol, query the first database with the second file-level identifier.

8. The non-transitory machine-readable medium of claim 6, wherein the object-level protocol is S3 protocol or Cloud Data Management Interface protocol and the file-level protocol is Network File System protocol or Common Internet File System protocol.

9. The non-transitory machine-readable medium of claim 6, wherein the first file-level identifier comprises a pathname and the first object-level identifier does not comprise a pathname.

10. The non-transitory machine-readable medium of claim 6, further comprising code to:
    provide a response to a client system that sent the first data transaction request.

11. The non-transitory machine-readable medium of claim 6, wherein a response from the first storage system conforms to the object-level protocol associated with the first storage system, and wherein the code further comprises instructions to modify the response to conform to the file-level protocol.

12. A computing device comprising:
    a memory containing a non-transitory machine readable medium comprising machine executable code having stored thereon instructions for performing a method of providing a unified namespace across heterogeneous storage systems;
    a processor coupled to the memory, the processor configured to execute the machine executable code to cause the processor to:
    translate a first data transaction request that includes a first file-level identifier in a first namespace that conforms to a file-level protocol to a second data transaction request that conforms to an object level protocol, wherein translating includes querying a first database of key-value pairs with the first file-level identifier, the keys including a plurality of file-level identifiers and the values including a plurality of object identifiers conforming to the object level protocol, wherein the first database is part of a distributed database;
    based on return of a first key-value pair that includes the first file-level identifier as the key, determine from the value of the first key-value pair a first storage system identifier, an identifier of a second namespace that conforms to the object-level protocol, and a first object-level identifier, thereby resolving the first object-level identifier using the first database;
    create the second data transaction request corresponding to the first data transaction request, wherein the second data transaction request is created with the first storage system identifier and the first object-level identifier instead of the first file-level identifier; and forward, via one of a plurality of network interfaces, to a first storage system identified by the first storage system identifier the second data transaction request.

13. The computing device of claim 12, wherein the a non-transitory machine-readable medium further comprises code executable by the processor to cause the processor to:
based on receipt, via one of the plurality of network interfaces, of a third data transaction request that includes a second file-level identifier in the first namespace that conforms to the file-level protocol, query the first database with the second file-level identifier.

14. The computing device of claim 12, wherein the object-level protocol is S3 protocol or Cloud Data Management Interface protocol and the file-level protocol is Network File System protocol or Common Internet File System protocol.

15. The computing device of claim 12, wherein the first file-level identifier comprises a pathname and the first object-level identifier does not comprise a pathname.

16. The computing device of claim 12, wherein the first file-level identifier identifies a group of files in a directory and the first object-level identifier identifies a first object in object storage.

* * * * *